(12) United States Patent
Li et al.

(10) Patent No.: US 11,626,804 B2
(45) Date of Patent: Apr. 11, 2023

(54) POWER CONVERTER, METHOD FOR DRIVING SWITCHING TRANSISTORS AND A POWER SUPPLY SYSTEM THEREOF

(71) Applicant: Huayuan semiconductor (shenzhen) limited company, Shenzhen (CN)

(72) Inventors: Shengfeng Li, Shenzhen (CN); Chunming Guo, Shenzhen (CN); Chenglong Zhang, Shenzhen (CN)

(73) Assignee: HUAYUAN SEMICONDUCTOR (SHENZHEN) LIMITED COMPANY, Shenzhen (CN)

( * ) Notice: Subject to any disclaimer, the term of this patent is extended or adjusted under 35 U.S.C. 154(b) by 59 days.

(21) Appl. No.: 17/384,604

(22) Filed: Jul. 23, 2021

(65) Prior Publication Data

US 2023/0027954 A1 Jan. 26, 2023

(51) Int. Cl.
*H02M 3/335* (2006.01)
*H02M 1/00* (2006.01)

(52) U.S. Cl.
CPC ..... *H02M 3/33507* (2013.01); *H02M 1/0029* (2021.05)

(58) Field of Classification Search
CPC .................................................. H02M 1/0029
See application file for complete search history.

(56) References Cited

U.S. PATENT DOCUMENTS

| | | | |
|---|---|---|---|
| 9,331,585 B1* | 5/2016 | Lin ................... | H02M 3/33507 |
| 9,373,997 B1* | 6/2016 | Lin ................... | H02M 3/33507 |
| 10,819,212 B1* | 10/2020 | Nagano ................ | H03K 17/165 |
| 11,018,591 B1* | 5/2021 | Lin ..................... | H02M 1/0029 |
| 2022/0224217 A1* | 7/2022 | Liu ..................... | H02M 1/0029 |

* cited by examiner

Primary Examiner — Alex Torres-Rivera
(74) Attorney, Agent, or Firm — NZ Carr Law Office

(57) ABSTRACT

A power converter includes: a switching transistor, a transformer, a control circuit; the control circuit is configured to determine a target voltage in a process that the switching transistor is driven to conduct; the target voltage can represent a voltage change of an input terminal of the switching transistor; when the target voltage starts to drop but is higher than a reference voltage, drive a control terminal of the switching transistor with a first driving current; when the target voltage decreases to be lower than the reference voltage, drive the switching transistor with a second driving current; the second driving current is higher than the first driving current; the switching transistor is driven by the first driving current for part or all of the time before entering the Miller plateau stage, and is driven by the second driving current after starting to enter the Miller plateau stage.

20 Claims, 6 Drawing Sheets

POWER CONVERTER, METHOD FOR DRIVING SWITCHING TRANSISTORS AND A POWER SUPPLY SYSTEM THEREOF

TECHNICAL FIELD

The present invention relates to a power supply circuit, and in particular, to a high-voltage power converter, a method for driving switching transistors, and a power supply system thereof.

BACKGROUND

High-voltage power converters (such as Flyback Converters) are a type of switch power converters, which are widely used in AC/DC and DC/DC conversion, and provide insulation and isolation between an input side and an output side.

By using a flyback converter as an example, core components of the flyback converter may include, for example, a switch and a transformer. The switch is controlled by a control circuit, and a high-frequency square wave signal is generated at two ends of a primary winding of the transformer by turning on/off the switch. The transformer transmits the generated high-frequency square wave signal to a secondary winding by magnetic induction, and through a rectification function of a rectifier circuit on the secondary side, a stable DC output is obtained at the output side.

Specifically, the switch is usually a switching transistor, such as a MOS transistor or a BJT. The primary winding on the input side can be grounded directly or indirectly through the switching transistor, and then voltage conversion can be controlled through on/off control of the switching transistor.

Moreover, in a switch converter, switching conduction loss of the switching transistor is the main part of power loss of the converter. To improve efficiency, rapid conduction of the switching transistor is required. However, during the rapid conduction, rapid voltage changes (such as dv/dt) may produce serious electromagnetic interference (EMI).

Therefore, how to effectively give considerations to both the efficiency and the EMI has become an urgent technical problem to be resolved in the field of high-voltage power converters.

SUMMARY

The present invention provides a power converter, a switching transistor driving method, and a power supply system, to effectively give considerations to both efficiency and EMI.

According to a first aspect of the present invention, a power converter is provided, including: a switching transistor, a transformer, and a control circuit, wherein the transformer includes a primary winding on an input side, and the switching transistor is provided with a control terminal, an input terminal, and an output terminal; one end of the primary winding is directly or indirectly connected to an input power supply to be converted, the other end of the primary winding is connected to the input terminal of the switching transistor, and the output terminal of the switching transistor is grounded through a resistor;

the control terminal of the switching transistor is connected to the control circuit; and the control circuit is configured to:

determine a target voltage in a process that the switching transistor is driven to conduct, wherein the target voltage is capable of representing a change in a voltage of the input terminal of the switching transistor; and the change includes a drop in the voltage of the input terminal of the switching transistor before the switching transistor enters a Miller plateau stage of the driving and conduction process;

when the target voltage starts to drop but is higher than a reference voltage, drive the control terminal of the switching transistor with a first driving current; and when the target voltage decreases to be lower than the reference voltage, start to drive the control terminal of the switching transistor with a second driving current; the second driving current is higher than the first driving current, wherein the reference voltage is configured such that:

the switching transistor is driven by the first driving current for part or all of the time before entering the Miller plateau stage, and the switching transistor is driven by the second driving current after starting to enter the Miller plateau stage.

Optionally, the target voltage is obtained by detecting the voltage of the input terminal of the switching transistor.

Optionally, the transformer further includes an auxiliary winding on the input side, and a detection terminal of the control circuit is directly or indirectly connected to the auxiliary winding; and the target voltage is obtained by detecting a voltage of the auxiliary winding.

Optionally, the power converter further includes a first resistor and a second resistor that are connected in series, and the first resistor and the second resistor, after being connected in series, are connected between a first end of the auxiliary winding and the ground, and a second end of the auxiliary winding is grounded; and an end of the control circuit is connected to the control terminal of the switching transistor, and another end of the control circuit is connected between the first resistor and the second resistor, to obtain a voltage of a node between the first resistor and the second resistor as the target voltage.

Optionally, the control circuit is further configured to:

after the target voltage starts to drop, determine a result of voltage comparison between the target voltage and the reference voltage.

Optionally, when determining the result of voltage comparison between the target voltage and the reference voltage, the control circuit is specifically configured to:

obtain a detection current matching the target voltage; and compare the detection current and a reference current, to use a result of current comparison between the detection current and the reference current as the result of voltage comparison, wherein the reference current is determined based on the reference voltage.

Optionally, the control circuit includes a driving unit, a voltage-current conversion unit, and a first current source; the reference current is formed by the first current source, the detection current is obtained by the voltage-current conversion unit, and the driving unit is connected to the control terminal of the switching transistor and a comparison feedback node between the voltage-current conversion unit and the first current source; and the driving unit is configured to:

if it starts to drive the switching transistor to conduct, then:

when the detection current is lower than the reference current, obtain a first signal generated by the comparison feedback node, and in response to the first signal, drive the control terminal of the switching transistor with the first driving current; and when the detection current is higher than the reference current, obtain a second signal generated by the comparison feedback node, and in response to the second signal, drive the control terminal of the switching transistor with the second driving current.

Optionally, the voltage-current conversion unit includes: a first transistor, a second transistor, a first field effect transistor (FET), a second FET, and a second current source;

an emitter of the first transistor is connected between the first resistor and the second resistor, a base of the first transistor is connected to a base of the second transistor, a collector of the first transistor is connected to a drain of the first FET, a collector of the second transistor is connected to a side of the second current source, a gate of the second FET is connected to a gate of the first FET, a source of the first FET and a source of the second FET are connected to another side of the second current source, and a drain of the second FET is connected to the first current source.

Optionally, a current flowing through the source and the drain of the first FET is an integer multiple of a current flowing through the source and the drain of the second FET.

Optionally, the control circuit is powered by electric energy generated by the auxiliary winding.

Optionally, the control circuit is further configured to control on/off of the switching transistor according to the voltage of the auxiliary winding, to adjust a converted voltage of the transformer.

Optionally, the switching transistor is a MOS transistor or a BJT.

A second aspect of the present invention provides a switching transistor driving method for a power converter, wherein the power converter includes a switching transistor, a transformer, and a control circuit, the transformer includes a primary winding on an input side, and the switching transistor is provided with a control terminal, an input terminal, and an output terminal; one end of the primary winding is directly or indirectly connected to an input power supply to be converted, the other end of the primary winding is connected to the input terminal of the switching transistor, and the output terminal of the switching transistor is grounded through a resistor; and the switching transistor driving method is applied to the control circuit or a driving unit in the control circuit, and the driving processing method includes:

determining a target voltage in a process that the switching transistor is driven to conduct, wherein the target voltage is capable of representing a change in a voltage of the input terminal of the switching transistor; and the change includes a drop in the voltage of the input terminal before the switching transistor enters a Miller plateau stage of the driving and conduction process;

when the target voltage starts to drop but is higher than a reference voltage, driving the control terminal of the switching transistor with a first driving current; and when the target voltage decreases to be lower than the reference voltage, starting to drive the control terminal of the switching transistor with a second driving current; and the second driving current is higher than the first driving current, wherein the reference voltage is configured such that:

the switching transistor is driven by the first driving current for part or all of the time before entering the Miller plateau stage, and the switching transistor is driven by the second driving current after starting to enter the Miller plateau stage.

Optionally, the target voltage is obtained by detecting the voltage of the input terminal of the switching transistor.

Optionally, the power converter further includes an auxiliary winding on the input side, and a detection terminal of the control circuit is directly or indirectly connected to the auxiliary winding; and the target voltage is obtained by detecting a voltage of the auxiliary winding.

Optionally, the power converter further includes a first resistor and a second resistor, wherein the first resistor and the second resistor, after being connected in series, are connected between a first end of the auxiliary winding and the ground, and a second end of the auxiliary winding is grounded; and an end of the control circuit is connected to the control terminal of the switching transistor, and another end of the control circuit is connected between the first resistor and the second resistor, wherein the determining a target voltage includes: obtaining a voltage of a node between the first resistor and the second resistor as the target voltage.

Optionally, the switching transistor driving method further includes:

after the target voltage starts to drop, determining a result of voltage comparison between the target voltage and the reference voltage.

Optionally, the determining a result of voltage comparison between the target voltage and the reference voltage includes:

comparing a detection current matching the target voltage and a reference current, to use a result of current comparison between the detection current and the reference current as the result of voltage comparison, wherein the reference current is determined based on the reference voltage.

A third aspect of the present invention provides a power supply system, including the power converter described in the first aspect or optional solutions of the first aspect.

In the process of providing the present invention, detailed analysis is performed on the process of conduction driving of the switching transistor of the power converter by the applicant, and the following provides description by using an example in which the switching transistor is a MOS transistor and an input terminal of the switching transistor is a drain.

The conduction of the switching transistor includes the following stages:

First stage: In this stage, a gate voltage of the switching transistor rises and a drain voltage thereof decreases. For the drain voltage, this stage may be regarded as a drop stage, and for the gate voltage or a gate-source voltage, this stage may be regarded as a rise stage.

Second stage: The gate and the drain of the switching transistor change quite little, which may be regarded as a Miller plateau stage.

Third stage: The gate voltage of the switching transistor rises and the drain voltage decreases to nearly 0.

In the above-mentioned first stage, a current between the source and the drain of the switching transistor is almost 0, and there is almost no power loss during the period of time. However, in this period of time, EMI may occur due to rapid drop of the drain voltage, and the EMI may be determined by a drop rate of the drain voltage (which may be represented as a slope of a curve of voltage with time). In the above-mentioned second and third stages, the switching transistor has been conducted, there is a current flowing through the source and the drain of the switching transistor, and the main power loss occurs in the second and third stages, especially in the second stage. Due to the existence of Miller effect, the drain voltage is relatively high and the period of plateau time is relatively long, and therefore generated power consumption is particularly obvious. After the third stage, the switching transistor is completely conducted, a voltage drop of the drain is quite small, and therefore the conduction loss is relatively small.

For the generated EMI and conduction loss, it is creatively provided in the present invention that: strength of a driving current of the switching transistor may be changed dynamically by matching the foregoing process, to help alleviate the EMI, increase a conduction speed, and prevent or alleviate impact of the EMI and the conduction loss on the conduction process, thereby effectively giving considerations to both the EMI and the conduction loss. In addition, on this basis, the present invention creatively provides: in a process that the switching transistor is driven to conduct, determining a target voltage capable of representing a change of a voltage of an input terminal of the switching transistor, wherein the change includes a drop in the voltage of the input terminal of the switching transistor before the switching transistor enters a Miller plateau stage of the driving and conduction process; and further, comparing a relationship between the target voltage and a reference voltage during a drop process of the target voltage, wherein a comparison result may be used as a reference for dynamically changing the strength of the driving current of the switching transistor, thereby accurately implementing that: the switching transistor is driven by a lower first driving current for part or all of the time before entering the Miller plateau stage, and the switching transistor is driven by a higher second driving current after starting to enter the Miller plateau stage. The effective considerations to both the EMI and the conduction loss in the conduction process of the switching transistor are achieved.

In addition, in a preferable solution, a detection voltage of an auxiliary winding is further used as the target voltage for representing a change of the voltage of the input terminal of the switching transistor, to avoid measurement of a voltage of the input terminal at a relatively high electric potential, thereby preventing a control circuit from bearing a high voltage and further effectively improving reliability and safety of the solution.

BRIEF DESCRIPTION OF DRAWINGS

To explain the embodiments of the present invention or the technical solutions of the prior art more clearly, the accompanying drawings to be used in the description of the embodiments or the prior art will be briefly described below. Apparently, the accompanying drawings in the following description are only some embodiments of the present invention, and a person of ordinary skill in the art may further obtain other drawings based on these accompanying drawings without creative efforts.

DESCRIPTION OF REFERENCE NUMERALS

1—Control circuit;
11—Driving unit;
12—Voltage-current conversion unit;
121—Second current source;
13—First current source;
2—switching transistor;
3—Auxiliary winding;
4—Primary winding;
5—Secondary winding; and
6—Rectifier module.

DETAILED DESCRIPTION OF THE EMBODIMENTS

The following clearly and completely describes the technical solutions in the embodiments of the present invention with reference to the accompanying drawings of the embodiments of the present invention. Clearly, the embodiments described are merely some embodiments, other than all embodiments, of the present invention. All other embodiments derived based on the embodiments of the present invention by a person of ordinary skill in the art without creative efforts shall fall within the protection scope of the present invention.

The terms "first", "second", "third", "fourth," and the like, if existent, in the specification, claims, and the accompanying drawings of the present invention are used to distinguish between similar objects and are not intended to describe a particular order or precedence. It should be understood that the terms used in such way are interchangeable where appropriate, so that the embodiments of the present invention described herein can be practiced in order other than those illustrated or described herein. In addition, the terms "comprise/include" and "have" and any variations thereof are intended to cover a non-exclusive meaning, for example, processes, methods, systems, products, or devices including a series of steps or units are not necessarily limited to those steps or units clearly listed, but may include other steps or units that are not explicitly listed or inherent to such processes, methods, products, or devices.

The technical solutions of the present invention are described in detail below with specific embodiments. The following specific embodiments may be combined with each other, and the same or similar concepts or processes may not be repeated in some embodiments.

Figure 1:
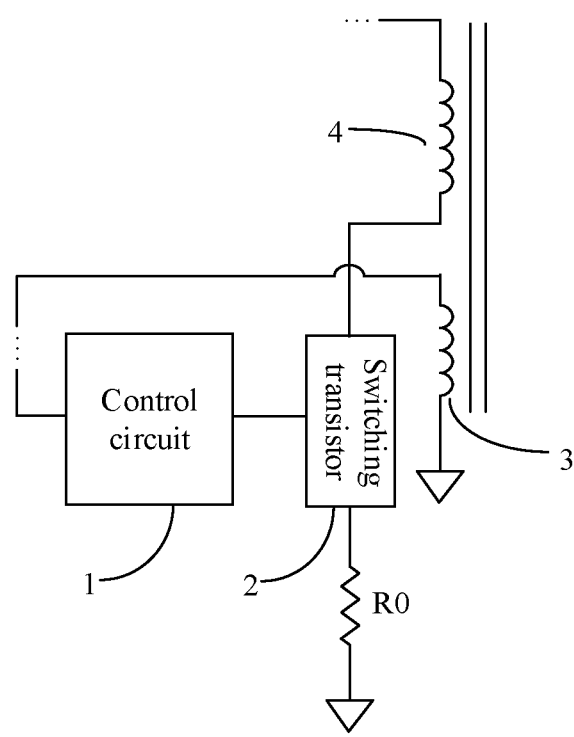
FIG. 1 is schematic construction diagram 1 of a power converter according to an embodiment of the present invention.
Figure 2:
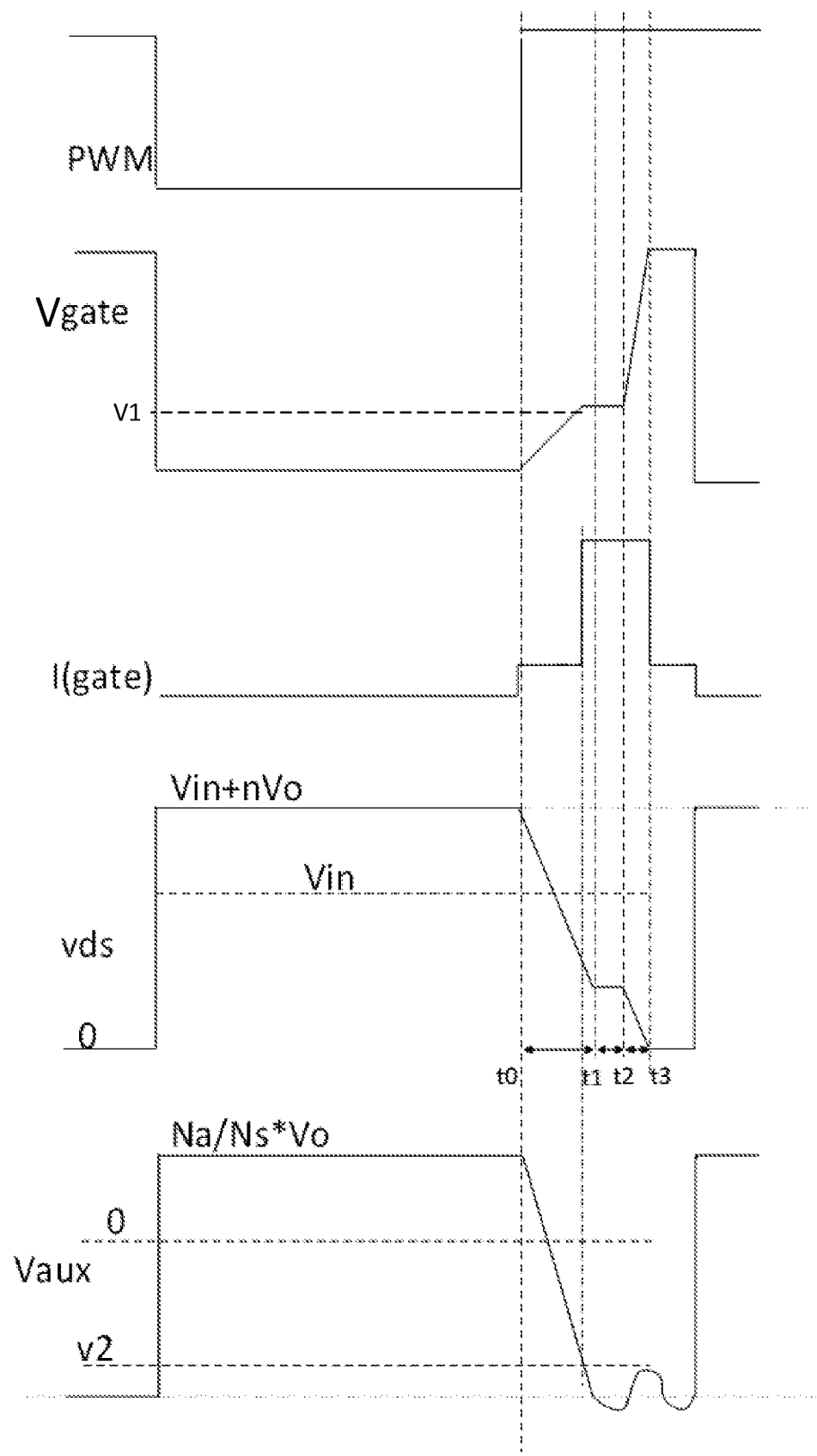
FIG. 2 is a schematic diagram of signals in all stages of the power converter.

FIG. 1 is schematic construction diagram 1 of a power converter according to an embodiment of the present invention. FIG. 2 is a schematic diagram of signals in all stages of the power converter.

Referring to FIG. 1, the power converter includes: a switching transistor 2 and a transformer. The transformer includes a primary winding 4 on an input side and further includes an auxiliary winding 3. The primary winding 4 is connected to an input terminal of the switching transistor 2, and an output terminal of the switching transistor 2 is grounded through a resistor R0. If the switching transistor 2 is an NMOS transistor, the primary winding 4 is connected to a drain of the switching transistor 2, and a source of the switching transistor 2 is grounded through the resistor R0.

Further, the power converter may further include a control circuit 1. A control terminal of the switching transistor 2 is connected to the control circuit 1. If the switching transistor 2 is an NMOS transistor, the control terminal of the switching transistor 2 may refer to a gate thereof. In addition, a voltage of the auxiliary winding 3 may be directly or indirectly obtained by the control circuit 1. Moreover, corresponding to the primary winding 4, a winding (not shown in FIG. 1) may be disposed on an output side of the power converter. It should be noted that the secondary winding may be disposed to have one path or a plurality of paths, and correspondingly the output of the power converter may have one path or a plurality of paths, all of which fall within the scope of the embodiment of the present invention.

The switching transistor 2 may be a MOS transistor, or may be a BJT. In a specific example, the switching transistor 2 may be, for example, an NMOS transistor.

To facilitate the description of the power converter involved in the embodiments of the present invention, the following describes the process of conducting the switching transistor in combination with FIG. 2, wherein an NMOS transistor is used as an example of the switching transistor. The process is similar if another MOS transistor or BJT is used.

In FIG. 2, Vaux represents a voltage of the auxiliary winding, Vds represents a source-drain voltage of the switching transistor, and Vgate represents a gate voltage of the switching transistor. In addition, by an example in which a PWM signal is used as a signal of the control circuit for controlling the gate of the switching transistor, Igate represents a gate current of the switching transistor in an example of the embodiment of the present invention, and V2 represents a reference voltage to be compared with the voltage of the auxiliary winding in an example of the embodiment of the present invention.

In addition, Na represents a quantity of turns of the auxiliary winding, Ns represents a quantity of turns of the secondary winding of the transformer, Vin represents a voltage of the primary winding, V0 represents a voltage of the secondary winding, and n represents a ratio of the quantity of turns of the primary winding to that of the secondary winding.

The conduction of the switching transistor includes the following stages:

First stage (which may be, for example, the stage from t0 to t1 in FIG. 2): A gate voltage Vgate of the switching transistor rises and a drain voltage Vd thereof decreases (which may be interpreted with reference to the source-drain voltage Vds). Similarly, the voltage Vaux of the auxiliary winding decreases synchronously. For the drain voltage, this stage may be regarded as a drop stage, and for the gate voltage or a gate-source voltage, this stage may be regarded as a rise stage.

Second stage (which may be, for example, the stage from t1 to t2 in FIG. 2): The gate and the drain of the switching transistor change quite little, which may be regarded as a Miller plateau stage. Correspondingly, the voltage Vaux of the auxiliary winding may fluctuate within a range.

Third stage (which may be, for example, the stage from t2 to t3 in FIG. 2): The gate voltage of the switching transistor rises and the drain voltage thereof decreases to nearly 0. Correspondingly, the voltage Vaux of the auxiliary winding may fluctuate within another range.

In the above-mentioned first stage, a current between the source and the drain of the switching transistor 2 is almost 0, and there is almost no power loss during the period of time. However, in this period of time, EMI may occur due to rapid drop of the drain voltage Vds, and the EMI may be determined by a drop rate of the drain voltage Vd (which may be represented as a slope of a curve of voltage with time). In the above-mentioned second and third stages, the switching transistor 2 has been conducted, there is a current flowing through the source and the drain of the switching transistor 2, and the main power loss occurs in the second and third stages, especially in the second stage. Due to the existence of Miller effect, the drain voltage Vds is relatively high and the period of plateau time is relatively long, and therefore generated power consumption is particularly obvious. After the third stage, the switching transistor 2 is completely conducted, a voltage drop of the drain is quite small, and therefore the conduction loss is relatively small.

By analyzing the drain voltage Vd and the voltage Vaux of the auxiliary winding 3, it can be learned that:

In the first stage, the drain voltage decreases gradually. When entering the second stage, the voltage of the input terminal (for example, the drain) no longer decreases, and in match with this, a change trend of the voltage of the auxiliary winding in the first stage is similar to that of the drain voltage of the switching transistor.

In view of this, in the embodiment of the present invention, the control circuit 1 is configured to:

determine a target voltage in a process that the switching transistor 2 is driven to conduct, wherein the target voltage is capable of representing a change in a voltage of the input terminal of the switching transistor 2 (for example, a drain voltage of the switching transistor which adopts an NMOS transistor); and the change includes a drop in the voltage of the input terminal of the switching transistor 2 before the switching transistor 2 enters a Miller plateau stage of the driving and conduction process;

when the target voltage starts to drop but is higher than a reference voltage V2, drive the control terminal of the switching transistor with a first driving current; and when the target voltage decreases to be lower than the reference voltage V2, start to drive the control terminal of the switching transistor with a second driving current; and the second driving current is higher than the first driving current, wherein the reference voltage is configured such that:

the switching transistor is driven by the first driving current for part or all of the time before entering the Miller plateau stage, and the switching transistor is driven by the second driving current after starting to enter the Miller plateau stage. For example, the reference voltage may be slightly higher than a critical voltage for entering the Miller plateau stage.

That the second driving current is higher than the first driving current in the embodiment of the present invention may be interpreted as that: the second driving current is a large current drive and the first driving current is a small current drive. When the first driving current is used, the switching transistor is in a weak driving state, and when the second driving current is used, the switching transistor is a strong driving state.

In addition, first driving currents of different switching transistors may vary, and second driving currents of different switching transistors may vary. By an example in which the switching transistor adopts an NMOS transistor, specific values of driving currents of different switching transistors may be associated with gate input capacitances of the switching transistors, and a larger gate input capacitance correspondingly indicates a larger second driving current and a larger first driving current.

Hence, for the generated EMI and conduction loss, it is creatively provided in the embodiment of the present invention that: strength of the driving current of the switching transistor may be changed dynamically by matching the stages of the foregoing process, to help alleviate the EMI, increase a conduction speed, and prevent or alleviate impact of the EMI and the conduction loss on the conduction process.

In a specific solution:

For the EMI, the EMI may be generated in the first stage, and therefore a relatively weak current is used for driving in the first stage, so that the drop rate of the drain voltage can be relatively slow and the EMI can be reduced.

For the conduction loss, the conduction loss may occur in the second and third stages, and to avoid or reduce the impact of the conduction loss on the conduction process and ensure the conduction speed, the switching transistor can be driven by a relatively strong current in the second and third stages, so that the switching transistor can be conducted faster.

In the first stage, the voltage of the input terminal of the switching transistor decreases gradually. When entering the second stage, the voltage of the input terminal no longer decreases, and therefore the present invention may adaptively adjust a driving current of the switching transistor based on the target voltage capable of representing the change in the voltage of the input terminal of the switching transistor, to change the driving current at an appropriate time (for example, at the time when the first stage ends or almost ends) through dynamic change, so as to alleviate the EMI in the first stage of the conduction process and reduce impact of conduction loss in other conduction processes (for example, the second and third stages), thereby effectively giving considerations to both the EMI and the conduction loss.

Further, in a solution in which the driving current of the switching transistor needs to be adaptively adjusted, how to determine the time for adjusting the driving current is a technical difficulty. One manner is to try to determine the stage of the switching transistor by detecting the voltage of the control terminal of the switching transistor, based on which the corresponding driving current is adjusted. For example, when the voltage of the control terminal is less than the corresponding Miller plateau voltage, the switching transistor may be controlled to be in a weak driving state, and when the voltage of the control terminal is greater than the corresponding Miller plateau voltage, the switching transistor may be controlled to be in a strong driving state. However, the first stage and the Miller plateau stage may overlap, and therefore it is still difficult to accurately distinguish the first stage from the second stage based on voltage measurement of the control terminal. Therefore, the manner only has a limited alleviation effect on the EMI.

Compared with the means of adjusting the driving current based on the voltage of the control terminal of the switching transistor, the embodiment of the present invention creatively introduces the target voltage capable of representing the change in the voltage of the input terminal of the switching transistor as a basis for selecting timing for adjustment, which can facilitate accurate distinguishing between the first stage and the second stage.

Generally, since the potential at the input terminal of the switching transistor is relatively high, if the potential at the input terminal of the switching transistor needs to be detected, an internal detection circuit of an IC needs to bear a high voltage, which requires high chip technique and device reliability. Therefore, the solution of detecting the potential at the input terminal of the switching transistor to determine the timing for adjusting the driving current would be considered to be infeasible by a person skilled in the art. The applicant holds the opinion that this is a technical bias in the art, and the embodiment of the present invention overcomes this technical bias, and just adopts the target voltage capable of representing the change in the voltage of the input terminal of the switching transistor as a basis for selecting timing for adjusting the driving current.

In a further preferable solution, in match with the voltage of the input terminal, a change trend of the voltage of the auxiliary winding in the first stage is similar to that of the voltage of the input terminal of the switching transistor, and therefore by determining whether the voltage of the auxiliary winding decreases to the reference voltage, whether the first stage is going to end currently can be determined. Hence, by representing the drain voltage by using the voltage of the auxiliary winding, direct measurement of the voltage of the input terminal at a relatively high electric potential can be avoided, thereby preventing the control circuit from bearing a high voltage and further effectively improving reliability and safety of the solution.

In other implementations, the embodiment of the present invention does not exclude the solution in which the voltage of the input terminal (for example, the drain voltage of the NMOS transistor) is directly detected, to control a change in the driving current. For example, the target voltage may alternatively be obtained by detecting the voltage of the input terminal of the switching transistor. It can be learned that whether the driving current is controlled directly based on the drain voltage or indirectly based on the voltage of the auxiliary winding, the solution does not depart from the description of the embodiment of the present invention.

It should further be pointed out that the EMI generated during conduction of the switching transistor is relatively small as compared with the EMI of the whole power converter and even the electronic device, and the impact brought about by the conduction loss is also small compared with that of the whole power converter. Therefore, the impact of the EMI and the conduction loss of the switching transistor is usually regarded as negligible, and to this regard, there is a need of a solution of giving considerations to both the EMI and the conduction loss of the switching transistor in the art, which is actually a technical bias in the art. However, due to the increasingly refined requirements for circuits in practice, the embodiment of the invention finds the necessity of overcoming this technical bias, effectively reduces the EMI, and gives considerations to both the EMI and the conduction loss.

Figure 3:
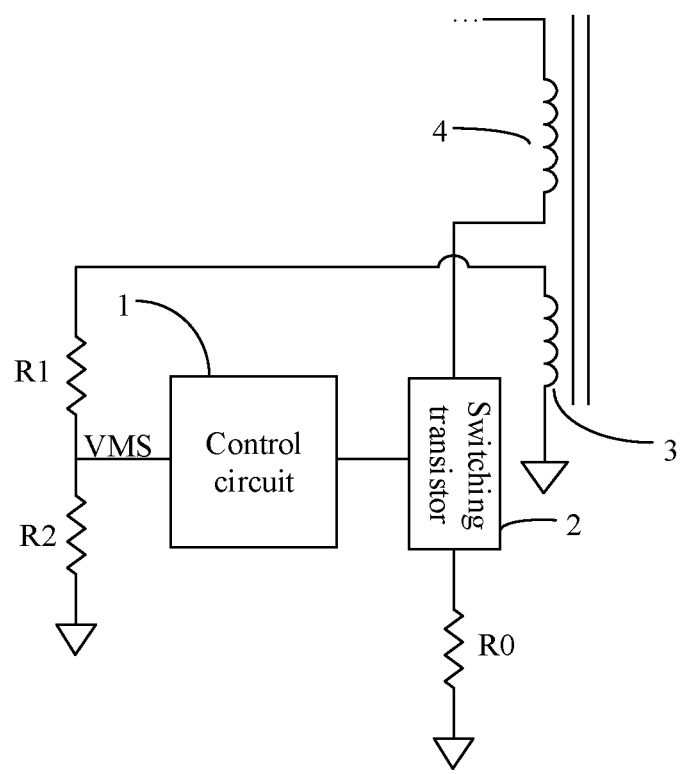
FIG. 3 is schematic construction diagram 2 of a power converter according to an embodiment of the present invention.
Figure 4:
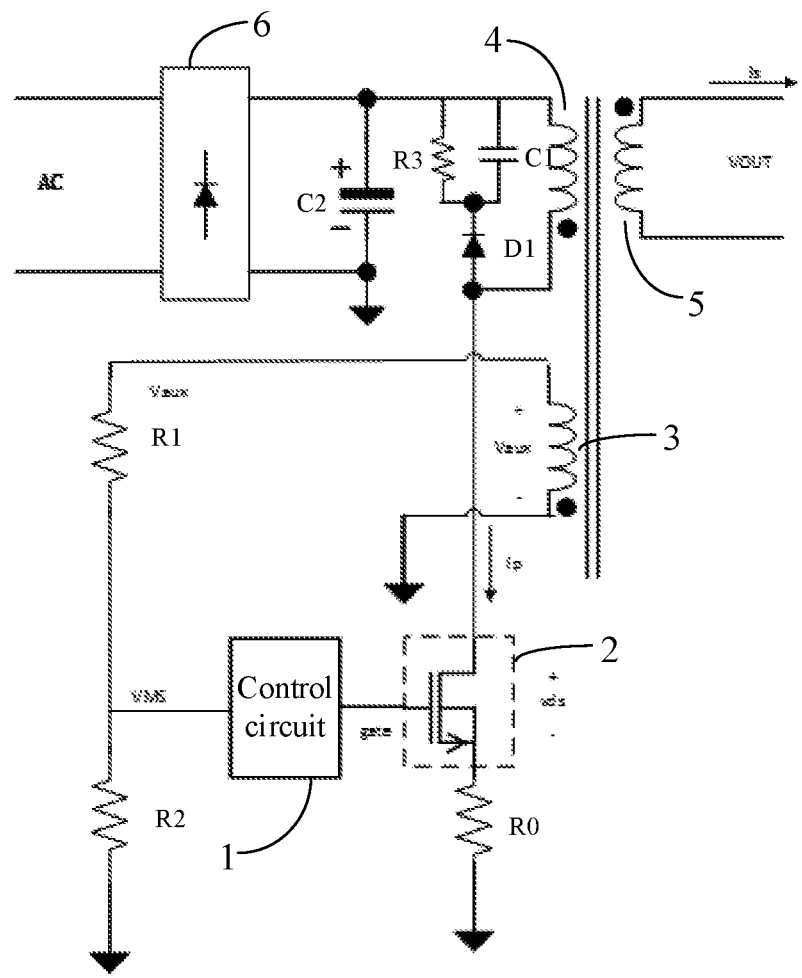
FIG. 4 is schematic construction diagram 3 of a power converter according to an embodiment of the present invention.

FIG. 3 is schematic construction diagram 2 of a power converter according to an embodiment of the present invention. FIG. 4 is schematic construction diagram 3 of a power converter according to an embodiment of the present invention.

Referring to FIG. 3 and FIG. 4, the power converter further includes a first resistor R1 and a second resistor R2. A first end of the auxiliary winding 3, the first resistor R1, the second resistor R2, and the ground are sequentially connected in series, and a second end of the auxiliary winding 3 is grounded. The control circuit 1 is connected between the first resistor R1 and the second resistor R2, to obtain a voltage of a node between the first resistor R1 and the second resistor R2 as a target voltage VMS. The target voltage VMS represents a voltage Vaux of the auxiliary winding 3, to further indirectly represent the voltage of the input terminal of the switching transistor.

The control circuit 1 is further configured to:

after the target voltage starts to drop, determine a result of voltage comparison between the target voltage and the reference voltage.

There may be various solutions for determining the result of voltage comparison between the target voltage and the reference voltage. For example, the comparison may be performed directly based on the voltages, or may be indirectly performed by using other parameters such as currents and power.

Through further analysis, it is found by the applicant that when the switching transistor is conducted and Vaux of the auxiliary winding is negative, the voltage between the first resistor and the second resistor (that is, the target voltage VMS) may still be around 0 V, and therefore, although the objective of the present invention can be substantially implemented by performing comparison directly based on the voltages, there are still problems such as low precision and accuracy. Therefore, in a preferable implementation, when determining a result of voltage comparison between the voltage of the auxiliary winding and the reference voltage according to the detection voltage, the control circuit is specifically configured to:

obtain a detection current Ivms matching the detection voltage; and compare the detection current Ivms and a reference current Iref, to use a result of current comparison between the detection current Ivms and the reference current Iref as the result of voltage comparison, wherein the reference current Iref is determined based on the reference voltage. That is, a different reference voltage may correspond to a different reference current, and therefore the result of current comparison may reflect the result of voltage comparison.

Figure 5:
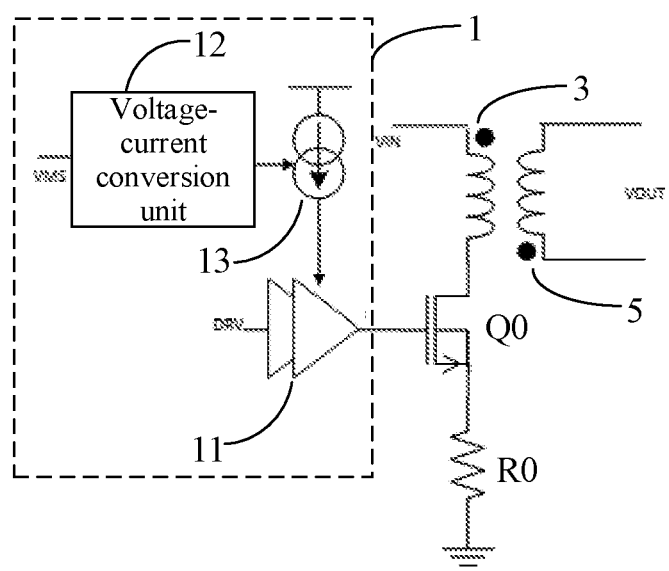
FIG. 5 is a schematic diagram illustrating operating principles of a control circuit according to an embodiment of the present invention.
Figure 6:
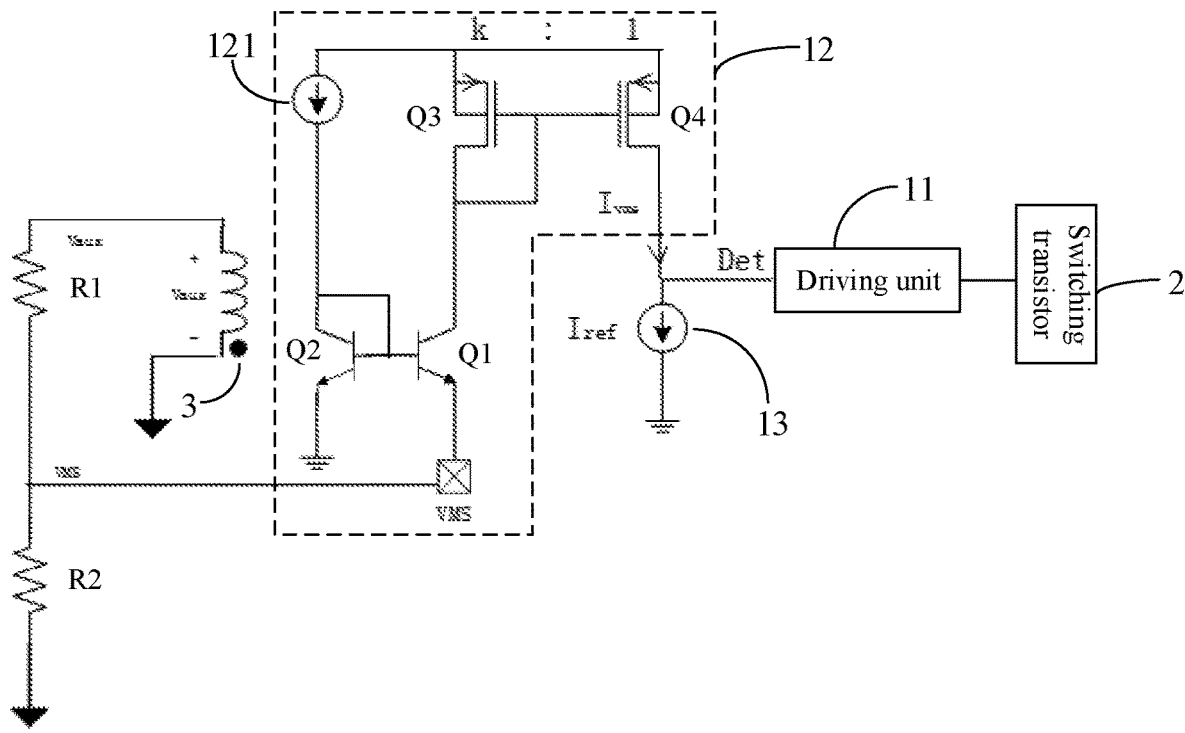
FIG. 6 is a schematic circuit diagram of a control circuit according to an embodiment of the present invention.

FIG. 5 is a schematic diagram illustrating operating principles of a control circuit according to an embodiment of the present invention. FIG. 6 is a schematic circuit diagram of a control circuit according to an embodiment of the present invention.

In a specific implementing process, referring to FIG. 5 and FIG. 6, the control circuit includes a driving unit 11, a voltage-current conversion unit 12, and a first current source; the reference current is formed by the first current source, the detection current is obtained by the voltage-current conversion unit, and the driving unit is connected to a gate of the switching transistor and a comparison feedback node between the voltage-current conversion unit and the first current source; and the driving unit 11 is configured to:

if it starts to drive the switching transistor to conduct, then:

when the detection current Ivms is lower than the reference current Iref formed by the first current source, indicating that the detection voltage is higher than the reference voltage, obtain a first signal generated by the comparison feedback node, and in response to the first signal, drive the gate of the switching transistor 2 with the first driving current; and when the detection current Ivms is higher than the reference current Iref formed by the first current source, indicating that the detection voltage is lower than the reference voltage, obtain a second signal generated by the comparison feedback node, and in response to the second signal, drive the gate of the switching transistor 2 with the second driving current.

If the first signal is a high level signal, the corresponding second signal is a low level signal. If the first signal is a low level signal, the corresponding second signal is a high level signal. Any signal that can be distinguished and identified by the driving unit to generate different currents does not depart from the above-mentioned first and second signals.

In some examples, the first and second signals may be generated based on current shunting, and in other examples, the first and second signals may alternatively be generated in other ways, for example, by using any existing or improved current comparison circuit.

Referring to FIG. 6, in a specific example, the voltage-current conversion unit 12 includes: a first transistor Q1, a second transistor Q2, a first FET Q3, a second FET Q4, and a second current source 121. The first transistor Q1 may adopt an NPN-type transistor, and the second transistor Q2 may adopt a PNP-type transistor.

An emitter of the first transistor Q1 is connected between the first resistor R1 and the second resistor R2, a base of the first transistor Q1 is connected to a base of the second transistor Q2, a collector of the first transistor Q1 is connected to a drain of the first FET Q3, a collector of the second transistor Q2 is connected to a side of the second current source 121 (for example, an output side of the second current source 121), a gate of the second FET Q4 is connected to a gate of the first FET Q3, a source of the first FET Q3 and a source of the second FET Q4 are connected to another side of the second current source 121 (for example, an input side of the second current source 121), and a drain of the second FET Q4 is connected to the first current source 13 (for example, an input side of the first current source 13). In addition, the output side of the first current source 13 may be grounded.

In the above-mentioned circuit, when the detection current Ivms>Iref, the Det signal is a high level signal (that is, the second signal), which indicates that the voltage Vaux of the auxiliary winding and the drain voltage of the switching transistor are already close to the second stage (or may be interpreted as being close to the Miller plateau stage). In this case, the driving current of the driving unit is increased, that is, driving is performed with the second driving current. When it is detected that Ivms<Iref, the Det signal is a low level signal (that is, the first signal), which indicates that the voltage Vaux of the auxiliary winding and the drain voltage of the switching transistor are relatively high, and the driving circuit needs to adopt a smaller driving current to alleviate the EMI, that is, the driving is performed by using a weaker the first driving current.

In a specific example, a current flowing through the source and the drain of the first FET is an integer multiple of a current flowing through the source and the drain of the second FET, which may be implemented through selection of the FETs.

In the embodiment of the present invention, the power converter specifically refers to a high-voltage power converter. As an example, the power converter may be a flyback converter. The transformer further provides insulation and isolation between an input stage and an output stage. Correspondingly, the auxiliary winding 3 may be an auxiliary winding configured for the power converter, to implement isolated signal transmission of the control circuit of the power converter. Further, the auxiliary winding 3 may have some functions, as follows:

In an example, the control circuit is powered by electric energy generated by the auxiliary winding.

In another example, the control circuit is further configured to control on/off of the switching transistor according to the voltage of the auxiliary winding, to adjust a converted voltage of the transformer.

In still another example, the auxiliary winding may implement both of the above functions.

In addition, referring to FIG. 4, the power converter may further include a rectifier module 6, a first capacitor C1, a second capacitor C2, a resistor R3, and a diode D1.

An output side of the rectifier module 6 is connected in parallel with the second capacitor C2, and is then connected to a first end of the primary winding 4. In addition, the resistor R3 is connected in parallel with the first capacitor C1 and is then connected in series to the diode D1, and the circuit connected in series is connected, in parallel with the primary winding 4, between two ends thereof. Correspondingly, a needed voltage VOUT may be formed in the secondary winding 5.

An embodiment of the present invention further provides a power supply system, including the power converter described in the first aspect or optional solutions of the first aspect.

Figure 7:
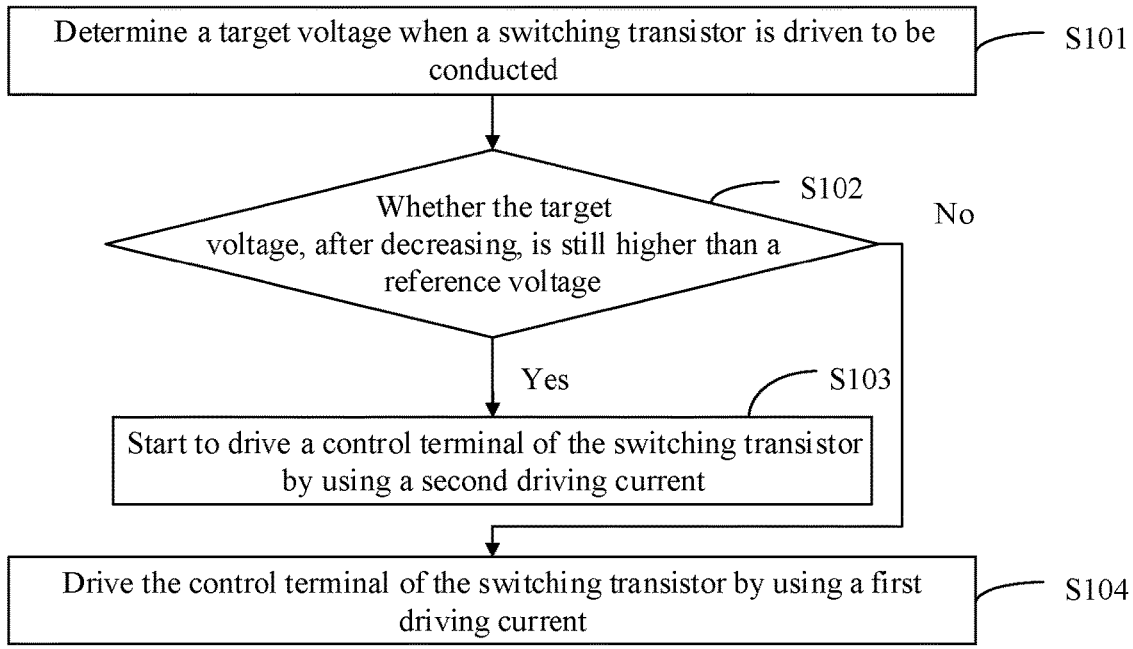
FIG. 7 is schematic flowchart 1 of a switching transistor driving method for a power converter according to an embodiment of the present invention.
Figure 8:
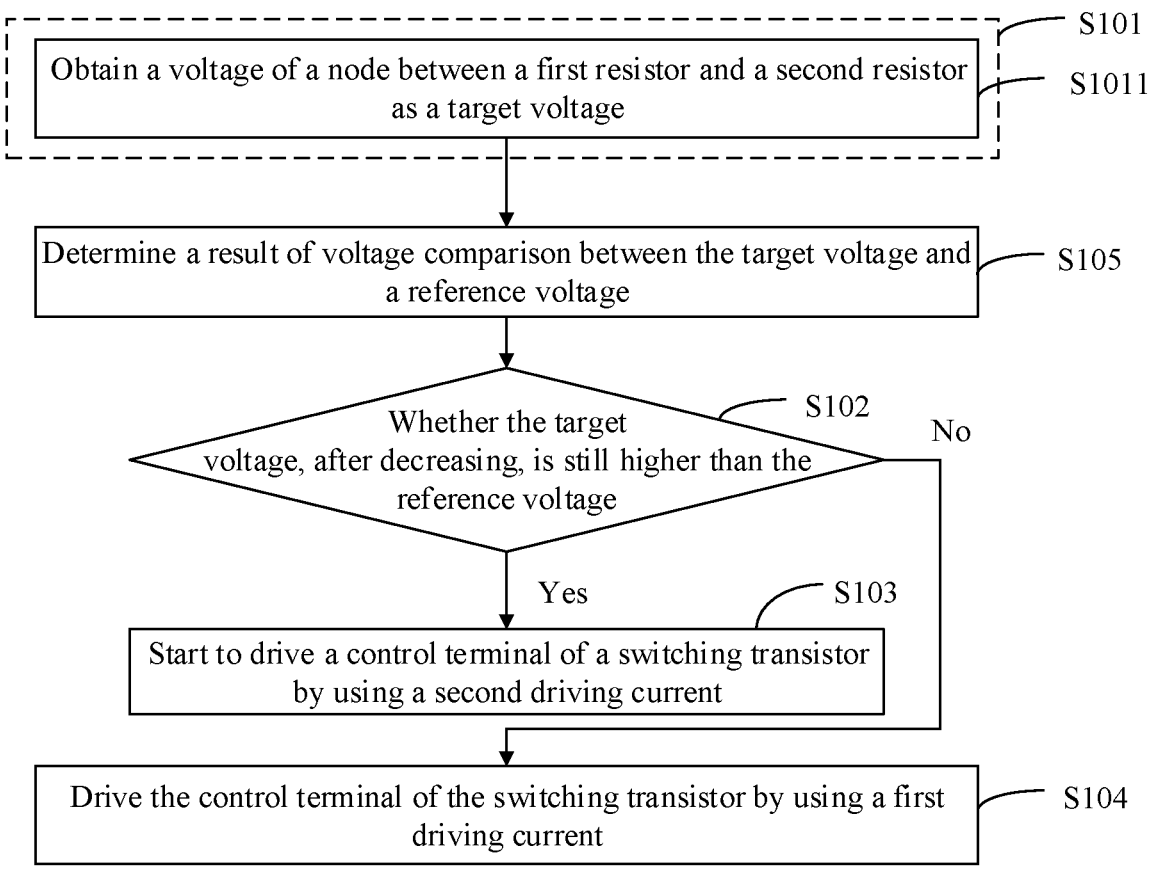
FIG. 8 is schematic flowchart 2 of a switching transistor driving method for a power converter according to an embodiment of the present invention.

FIG. 7 is schematic flowchart 1 of a switching transistor driving method for a power converter according to an embodiment of the present invention. FIG. 8 is schematic flowchart 2 of a switching transistor driving method for a power converter according to an embodiment of the present invention.

The method embodiments in FIG. 7 and FIG. 8 may be understood as being implemented based on the above-mentioned power converter, and therefore, repeated technical terms, technical effects, or the like are not repeated again in the following text.

The switching transistor driving method is applied to the control circuit 1 or the driving unit 11 in the control circuit 1, and the driving method includes:

S101: Determine a target voltage when the switching transistor is driven to conduct.

S102: Whether the target voltage, after decreasing, is still higher than a reference voltage.

If the determining result of step S102 is yes, step S103 may be performed, and if the determining result of step S102 is no, that is, if the target voltage decreases to be lower than the reference voltage, step S104 may be performed.

S103: Drive a control terminal of the switching transistor with a first driving current.

S104: Drive the control terminal of the switching transistor with a second driving current.

Optionally, referring to FIG. 8, step S101 specifically include:

S1011: Obtain a voltage of a node between the first resistor and the second resistor as the target voltage.

Before step S102, the method may further include:

S105: Determine a result of voltage comparison between the target voltage and the reference voltage.

Optionally, step S105 specifically includes:

comparing a detection current matching the target voltage and a reference current, to use a result of current comparison between the detection current and the reference current as the result of voltage comparison, wherein the reference current is determined based on the reference voltage.

Further, any foregoing description of the function of the control circuit can be regarded as an optional solution of the method according to the embodiment of the present invention and is not repeated herein.

Finally, it should be noted that the above embodiments are only used to illustrate the technical solutions of the present invention, but not to limit the present invention. Although the present invention has been described in detail with reference to the foregoing embodiments, a person of ordinary skill in the art shall understand that modifications may be made to the technical solutions described in the foregoing embodiments, or some or all of the technical features thereof may be equivalently substituted. However, these modifications or substitutions do not essentially depart the corresponding technical solutions from the scope of the technical solutions of the embodiments of the present invention.

What is claimed is:

1. A power converter, comprising:
   a switching transistor,
   a transformer, and
   a control circuit,
   wherein the transformer comprises a primary winding on an input side, and the switching transistor is provided with a control terminal, an input terminal, and an output terminal; a first end of the primary winding is directly or indirectly connected to an input power supply to be converted, a second end of the primary winding is connected to the input terminal of the switching transistor, and the output terminal of the switching transistor is grounded through a resistor;
   the control terminal of the switching transistor is connected to the control circuit; and
   the control circuit is configured to:
      determine a target voltage in a process that the switching transistor is driven to conduct, wherein the target voltage is capable of representing a change in a voltage of the input terminal of the switching transistor; and the change comprises a drop in the voltage of the input terminal of the switching transistor before the switching transistor enters a Miller plateau stage of a driving and conduction process;
      when the target voltage starts to drop but is higher than a reference voltage, drive the control terminal of the switching transistor with a first driving current; and
      when the target voltage decreases to be lower than the reference voltage, drive the control terminal of the switching transistor with a second driving current; and the second driving current is higher than the first driving current, wherein
      the reference voltage is configured such that:
   the switching transistor is driven by the first driving current for part or all time before entering the Miller plateau stage, and the switching transistor is driven by the second driving current after starting to enter the Miller plateau stage.

2. The power converter according to claim 1, wherein the target voltage is obtained by detecting the voltage of the input terminal of the switching transistor.

3. The power converter according to claim 2, wherein the control circuit is further configured to:
   after the target voltage starts to drop, determine a result of voltage comparison between the target voltage and the reference voltage.

4. The power converter according to claim 1, wherein the transformer further comprises an auxiliary winding on the input side, and a detection terminal of the control circuit is directly or indirectly connected to the auxiliary winding; and the target voltage is obtained by detecting a voltage of the auxiliary winding.

5. The power converter according to claim 4, further comprising a first resistor and a second resistor that are connected in series, wherein the first resistor and the second resistor, after being connected in series, are connected between a first end of the auxiliary winding and the ground, a second end of the auxiliary winding is grounded; an end of the control circuit is connected to the control terminal of the switching transistor, and another end of the control circuit is connected between the first resistor and the second resistor, to obtain a voltage of a node between the first resistor and the second resistor as the target voltage.

6. The power converter according to claim 4, wherein the control circuit is powered by electric energy generated by the auxiliary winding.

7. The power converter according to claim 4, wherein the control circuit is further configured to control on/off of the switching transistor according to the voltage of the auxiliary winding, to adjust a converted voltage of the transformer.

8. The power converter according to claim 1, wherein the control circuit is further configured to:
after the target voltage starts to drop, determine a result of voltage comparison between the target voltage and the reference voltage.

9. The power converter according to claim 8, wherein determining the result of voltage comparison between the target voltage and the reference voltage specifically comprises:
obtaining a detection current matching the target voltage; and
comparing the detection current and a reference current, to use a result of current comparison between the detection current and the reference current as the result of voltage comparison, wherein the reference current is determined based on the reference voltage.

10. The power converter according to claim 9, wherein the control circuit comprises a driving unit, a voltage-current conversion unit, and a first current source; the reference current is formed by the first current source, the detection current is obtained by the voltage-current conversion unit, and the driving unit is connected to the control terminal of the switching transistor and a comparison feedback node between the voltage-current conversion unit and the first current source; and
the driving unit is configured to:
if it starts to drive the switching transistor to conduct, then:
when the detection current is lower than the reference current, obtain a first signal generated by the comparison feedback node, and in response to the first signal, drive the control terminal of the switching transistor with the first driving current; and
when the detection current is higher than the reference current, obtain a second signal generated by the comparison feedback node, and in response to the second signal, drive the control terminal of the switching transistor with the second driving current.

11. The power converter according to claim 10, wherein the voltage-current conversion unit comprises: a first transistor, a second transistor, a first field effect transistor, a second field effect transistor, and a second current source;
an emitter of the first transistor is connected between the first resistor and the second resistor, a base of the first transistor is connected to a base of the second transistor, a collector of the first transistor is connected to a drain of the first field effect transistor, a collector of the second transistor is connected to a side of the second current source, a gate of the second field effect transistor is connected to a gate of the first field effect transistor, a source of the first field effect transistor and a source of the second field effect transistor are connected to another side of the second current source, and a drain of the second field effect transistor is connected to the first current source.

12. The power converter according to claim 11, wherein a current flowing through the source and the drain of the first field effect transistor is an integer multiple of a current flowing through the source and the drain of the second field effect transistor.

13. The power converter according to claim 1, wherein the switching transistor is a MOS transistor or a BJT.

14. A power supply system, comprising the power converter according to claim 1.

15. A switching transistor driving method for a power converter, wherein the power converter comprises a switching transistor, a transformer, and a control circuit, the transformer comprises a primary winding on an input side, and the switching transistor is provided with a control terminal, an input terminal, and an output terminal; one end of the primary winding is directly or indirectly connected to an input power supply to be converted, the other end of the primary winding is connected to the input terminal of the switching transistor, and the output terminal of the switching transistor is grounded through a resistor; and the switching transistor driving method is applied to the control circuit or a driving unit in the control circuit, and the driving method comprises:
determining a target voltage in a process that the switching transistor is driven to conduct, wherein the target voltage is capable of representing a change in a voltage of the input terminal of the switching transistor; and the change comprises a drop in the voltage of the input terminal before the switching transistor enters a Miller plateau stage of the driving and conduction process;
when the target voltage starts to drop but is higher than a reference voltage, driving the control terminal of the switching transistor with a first driving current; and
when the target voltage decreases to be lower than the reference voltage, starting to drive the control terminal of the switching transistor with a second driving current; and the second driving current is higher than the first driving current, wherein
the reference voltage is configured such that:
the switching transistor is driven by the first driving current for part or all of the time before entering the Miller plateau stage, and the switching transistor is driven by the second driving current after starting to enter the Miller plateau stage.

16. The switching transistor driving method for a power converter according to claim 15, wherein the target voltage is obtained by detecting the voltage of the input terminal of the switching transistor.

17. The switching transistor driving method for a power converter according to claim 15, wherein the power converter further comprises an auxiliary winding on the input side, and a detection terminal of the control circuit is directly or indirectly connected to the auxiliary winding; and the target voltage is obtained by detecting a voltage of the auxiliary winding.

18. The switching transistor driving method for a power converter according to claim 17, wherein the power converter further comprises a first resistor and a second resistor, wherein the first resistor and the second resistor, after being connected in series, are connected between a first end of the auxiliary winding and the ground, a second end of the auxiliary winding is grounded; an end of the control circuit is connected to the control terminal of the switching transistor, and another end of the control circuit is connected between the first resistor and the second resistor, wherein
the determining a target voltage comprises: obtaining a voltage of a node between the first resistor and the second resistor as the target voltage.

19. The switching transistor driving method for a power converter according to claim 15, wherein the switching transistor driving method further comprises:
after the target voltage starts to drop, determining a result of voltage comparison between the target voltage and the reference voltage.

20. The switching transistor driving method for a power converter according to claim 19, wherein the determining the result of voltage comparison between the target voltage and the reference voltage comprises:
comparing a detection current matching the target voltage and a reference current, to use a result of current comparison between the detection current and the reference current as the result of voltage comparison.

* * * * *